United States Patent [19]

Kidokoro

[11] Patent Number: 5,746,186

[45] Date of Patent: May 5, 1998

[54] FUEL STORING DEVICE FOR AN AUTOMOBILE

[75] Inventor: Toru Kidokoro, Hadano, Japan

[73] Assignee: Toyota Jidosha Kabushiki Kaisha, Aichi, Japan

[21] Appl. No.: 807,169

[22] Filed: Feb. 27, 1997

[30] Foreign Application Priority Data

Feb. 29, 1996 [JP] Japan ................... 8-043323

[51] Int. Cl.[6] .................................. F02M 37/04
[52] U.S. Cl. .......................... 123/516; 137/587
[58] Field of Search ...................... 123/516, 518, 123/519, 520; 137/587; 220/4.14, 905

[56] References Cited

U.S. PATENT DOCUMENTS

| | | | |
|---|---|---|---|
| 3,617,034 | 11/1971 | Skinner | 261/22 |
| 3,701,540 | 10/1972 | Pringle | 280/5 |
| 3,949,720 | 4/1976 | Zipprich et al. | 123/136 |
| 3,977,379 | 8/1976 | Weissenbach | 123/136 |
| 5,056,493 | 10/1991 | Holzer | 123/518 |
| 5,460,135 | 10/1995 | Ohashi et al. | 123/518 |
| 5,596,971 | 1/1997 | Kidokoro | 123/516 |

FOREIGN PATENT DOCUMENTS

| | | |
|---|---|---|
| 60-157427 U | 10/1985 | Japan . |
| 60-158922 U | 10/1985 | Japan . |
| 60-158923 U | 10/1985 | Japan . |
| 6416426A | 1/1989 | Japan . |
| 7132738A | 5/1995 | Japan . |

Primary Examiner—Thomas N. Moulis
Attorney, Agent, or Firm—Kenyon & Kenyon

[57] ABSTRACT

A fuel tank for an automobile has a separator film to separate the inside of a fuel storage container of the fuel storing device into a fuel storage part and a space. The separator film is movable with a surface of liquid fuel in the fuel storage part. A filler pipe is connected to the fuel storage part. The filler pipe has a nozzle seal that seals a gap with respect to a refueling nozzle inserted into the filler pipe. A conduit communicates a part of the filler pipe adjacent to the nozzle seal with an upper part of the fuel storage part. A closure preventing means prevents the separator film from closing an opening of the conduit at the upper part of the fuel storage part. The closure preventing means prevents a negative pressure from being produced around the refueling nozzle before the fuel storage container is fully filled with fuel. When the refueling nozzle has an automatic stopper, the closure preventing means lets the automatic stopper stop the supply of fuel in response to a negative pressure only after the fuel storage container is fully filled with fuel.

9 Claims, 7 Drawing Sheets

FUEL STORING DEVICE FOR AN AUTOMOBILE

BACKGROUND OF THE INVENTION

1. Field of the Invention

The present invention relates to a fuel storing device for an automobile and, particularly, to one employing a separator film that separates the inside of a fuel storage container of the fuel storing device into a fuel storage part and a space above the fuel storage part. The fuel storage part is connected to a filler pipe through which fuel is poured into the fuel storage part. The separator film is movable with the surface of the liquid fuel in the fuel storage part.

2. Description of the Related Art

Regulations to protect the environment against air pollution have become more severe. Emitting evaporated fuel into the atmosphere during refueling will be heavily restricted in the near future.

In the above described situation, many devices for preventing the evaporated fuel from being emitted to the atmosphere during refueling have been proposed.

For example, the assignee of the present invention discloses a fuel storing device for an automobile which has a flexible bag to enclose a fuel storage part or a space on the fuel storage part (U.S. Pat. No. 5,596,971).

The flexible bag is deformed to follow the surface of liquid fuel in the fuel storage part to prevent the evaporated fuel from staying on the fuel storage part during refueling.

It is important during refueling to prevent atmospheric air from entering into the filler pipe. Otherwise, the air may form a space between the flexible bag and the surface of fuel, to cause the fuel to evaporate. The evaporated fuel gradually increases the pressure in the fuel storage part and then leaks into the atmosphere. To solve this problem, the device of the above disclosure arranges a nozzle seal between a refueling nozzle and the filler pipe.

FIG. 2 shows the details of the refueling nozzle. The refueling nozzle 5 has an automatic stopper that stops refueling by closing a fuel path when a negative pressure around a front area A of the refueling nozzle 5 increases.

The device of the above disclosure employing the nozzle seal 6 has a conduit 8 extending between the filler pipe 4 and the top of the fuel storage part (FIG. 1). The conduit 8 guides gas at an upper part of the fuel storage part toward the front area A of the refueling nozzle 5, thereby preventing a negative pressure in the area A and an erroneous operation of the automatic stopper before the fuel container is fully filled with fuel. When the fuel container of the fuel storage part is fully filled with fuel to close an opening of the conduit 8 toward the fuel storage part, gas at the upper part of the fuel storage part is not guided toward the front area A of the nozzle 5. This produces a negative pressure in the area A to activate the automatic stopper.

Since the flexible bag follows the surface of liquid fuel in the fuel storage part, it will interfere with the opening of the conduit 8 when the quantity of fuel becomes less. If refueling is carried out under this situation, the flexible bag closes the opening of the conduit 8 to produce a negative pressure in the front area A of the refueling nozzle 5 and activate the automatic stopper before the fuel container is fully filled with fuel.

SUMMARY OF THE INVENTION

An object of the present invention is to provide a fuel storing device for an automobile, having a separator film that is movable with the level of fuel in the fuel tank without interfering a refueling action.

In order to accomplish the object, the present invention provides a fuel storing device for an automobile, which has a fuel storage container having a separator film therein. The separator film separates the inside of the fuel storage container into a fuel storage part and a space and is movable with the surface of liquid fuel in the fuel storage part. The fuel storage part is connected to a filler pipe through which fuel is poured into the fuel storage part. A nozzle seal is arranged in the filler pipe, to seal a gap with respect to a refueling nozzle inserted into the filler pipe. A conduit extends from a part of the filler pipe adjacent to the nozzle seal to an upper part of the fuel storage part. A closure preventing means prevents the separator film from closing an opening of the conduit toward the fuel storage part

DESCRIPTION Of THE PREFERRED EMBODIMENTS

Figure 1:
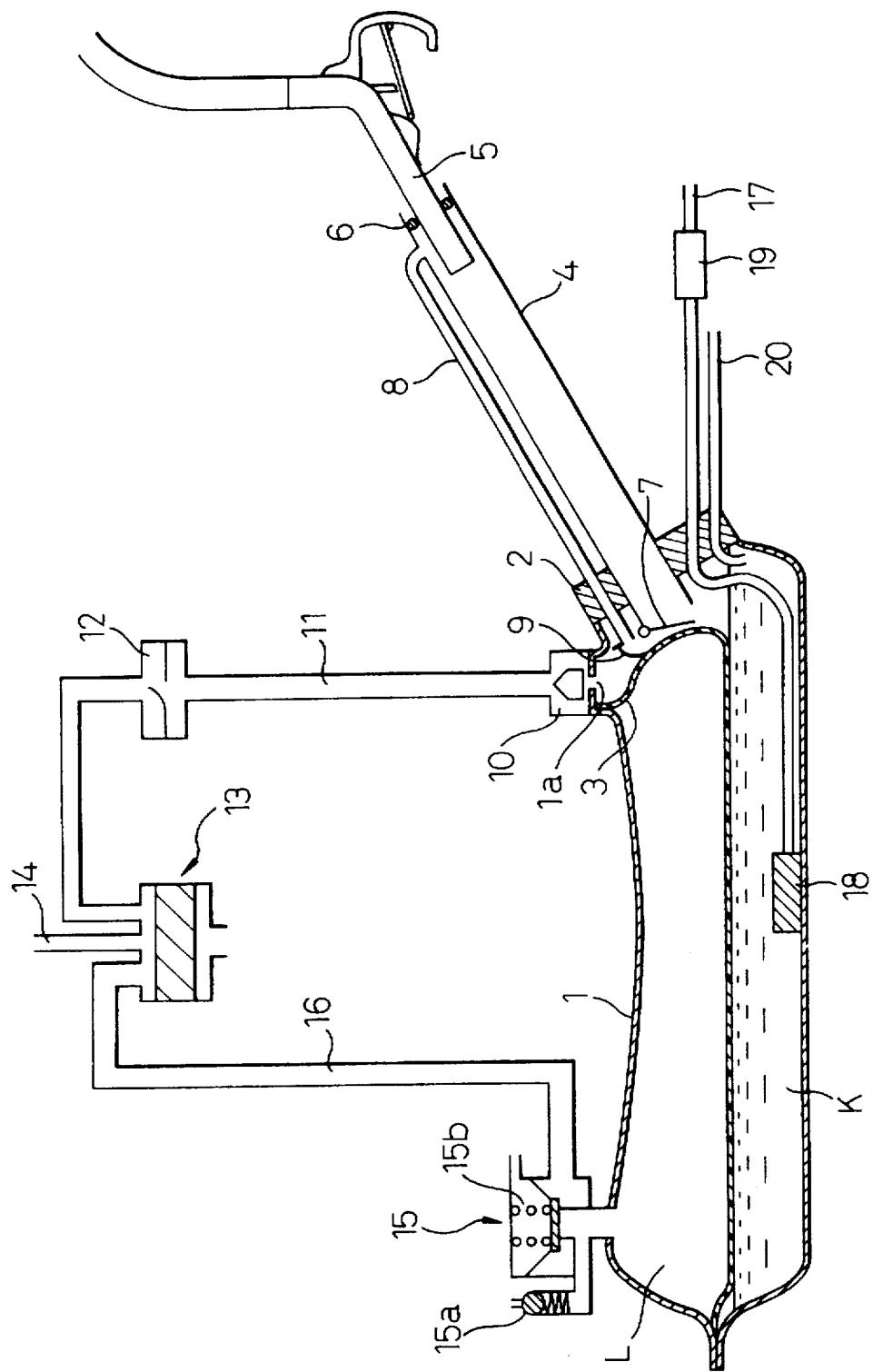
FIG. 1 shows a fuel storing device according to a first embodiment of the present invention.

FIG. 1 shows a fuel storing device for an automobile according to the first embodiment of the present invention. A tank shell 1 is made of rigid material such as metal or plastic. A side of the tank shell 1 has a flange 2 to attach pipes thereto.

A separator film 3 is made of flexible material. The top of the separator film 3 is tightly fitted around a port 1a for discharging evaporated fuel and around the flange 2. The other part of the separator film 3 freely moves with the surface of liquid fuel in the tank shell 1 according to the actions of a pressure adjuster 15. The bottom of the separator film 3 may be thickened or fixed to the tank shell 1, to improve the durability thereof against friction caused when the automobile accelerates or decelerates.

The separator film 3 defines a fuel storage part K and a space L in the tank shell 1. A filler pipe 4 is used to pour fuel into the storage part K. The filler pipe 4 extends up to an external body of the automobile and is covered with a filler cap, which is removed when refueling. In FIG. 1, the filler cap is removed and a refueling nozzle 5 is inserted in the filler pipe 4 for refueling.

The filler pipe 4 has a nozzle seal 6 to seal a gap between the refueling nozzle 5 and the filler pipe 4.

An opening of the filler pipe 4 adjacent to the separator film 3 has a check valve 7. When the refueling nozzle 5 is removed, the check valve 7 prevents fuel in the fuel storage part K from rushing back into the filler pipe 4.

A conduit 8 connects a part of the filler pipe 4 below the nozzle seal 6 to an upper part of the fuel storage part K. A conduit cover 9 acts as a closure preventive unit according to the present invention, and prevents the opening of the conduit 8 from being closed by the separator film 3.

The port 1a has a rollover valve 10, which is connected to a vapor line 11. The vapor line 11 has a reed valve 12 and is connected to a canister 13. If the car rolls over, the rollover valve 10 prevents fuel in the tank shell 1 from leaking outside. When the car is in a normal posture, the rollover valve 10 passes evaporated fuel from the tank shell 1 to the canister 13.

The reed valve 12 blocks a flow from the canister 13 toward the fuel storage part K and allows a flow from the part K toward the canister 13. Accordingly, evaporated fuel produced in the part K is adsorbed by the canister 13.

The canister 13 is connected to an intake duct (not shown) of an engine of the automobile through a purge line 14. Fuel released from the canister 13 is burned in the engine together with a mixture of intake air introduced through an air cleaner and fuel injected from a fuel injector.

The pressure adjuster 15 adjusts a pressure in the space L according to a change in the surface of the liquid fuel in the fuel storage part K. The pressure adjuster 15 has a first valve 15a and a second valve 15b. When the pressure of the space D becomes lower than atmospheric pressure, the first valve 15a opens to let the atmospheric pressure press the separator film 3 so that the separator film 3 may be in close contact with the surface of liquid fuel. When the pressure of the space L increases to a specific value higher than an atmospheric pressure, the second valve 15b opens to release the pressure of the space L into the canister 13 through a line 16, thereby preventing an excessive pressure on the fuel storage part K. Except during refueling, the second valve 15b is closed to close the space L and pressurize the part K to promote discharging evaporated fuel from the part K into the canister 13.

A pipe 17 has a filter 18 arranged at the bottom of the fuel storage part K. The pipe 17 is connected to a fuel pump 19 that sends fuel to the fuel injector of the engine. A return pipe 20 has an end connected to the pipe 17 in front of the fuel injector and another end connected to the part K, to return excessive fuel from the fuel injector to the part K.

Figure 2:
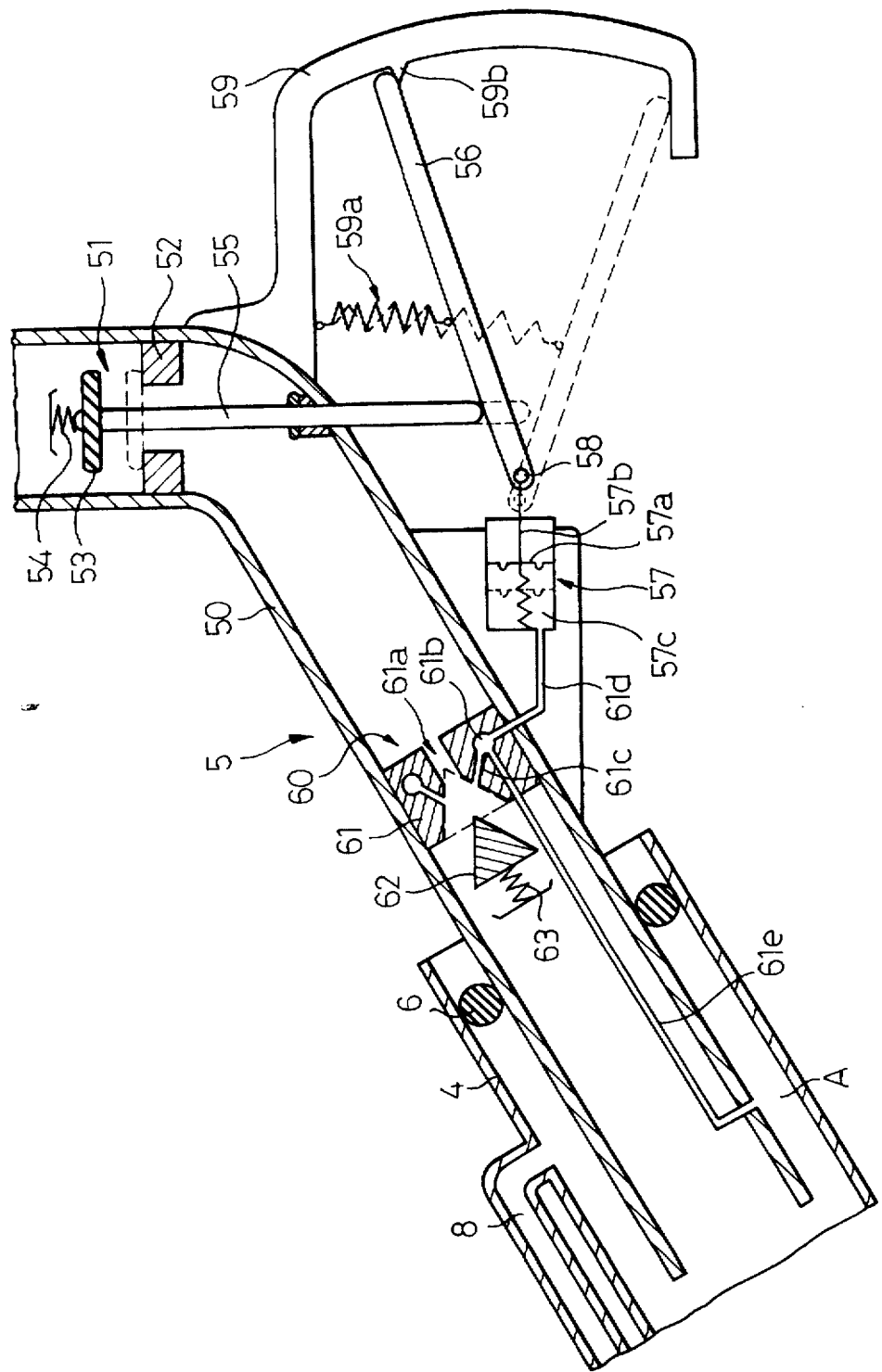
FIG. 2 shows a refueling nozzle.

FIG. 2 shows the details of the refueling nozzle 5. The refueling nozzle 5 has a nozzle pipe 50. The nozzle pipe 50 is tapered toward a front end thereof so that it is sealed by the nozzle seal 6 when the same is inserted into the filler pipe 4.

A first valve mechanism 51 is arranged upstream of a bend of the nozzle pipe 50. The first valve mechanism 51 has a seat 52 having a center path, and a plug 53. A spring 54 is attached to the nozzle pipe 50 and always pushes the plug 53 to the seat 52. The plug 53 has a rod 55, which extends outside the nozzle pipe 50.

A lever 56 is rotatably attached to a shaft 58, which is attached to a rod 57b of a diaphragm 57. The rod 57b is fixed to a movable member 57a. When a pressure in a negative pressure chamber 57c defined in the diaphragm 57 is negative, the movable member 57a moves to left in FIG. 2, to move the lever 56 accordingly. A grip 59 has a spring 59a to always push the lever 56 downwardly.

When refueling, the nozzle pipe 50 of the refueling nozzle 5 is inserted into the filler pipe 4 until it is sufficiently sealed with the nozzle seal 6. The lever 56 is turned upwardly so that a free end 56a thereof rises above a stopper 59b of the grip 59. At this time, there is no negative pressure in the chamber 57c so that the shaft 58 is at a right end position.

When the shaft 58 is at the right end position, the free end 56a of the lever 56 is stopped by the stopper 59b even if no gripping force is applied to the lever 56.

When the lever 56 is turned upwardly, the rod 55 of the first valve mechanism 51 is pushed upwardly. This moves the plug 53 away from the seat 52, to let fuel flow through the path 52a formed at the center of the seat 52. The fuel reaches the upstream side of a second valve mechanism 60.

The second valve mechanism 60 has a seat 61, a plug 62, and a weak spring 63 for pushing the plug 62 to the seat 61. The spring 63 is fitted to the nozzle pipe 50. The seat 61 has a path 61a whose downstream side is widened. An annular air path 61b is formed inside the seat 61. The air path 61b communicates with the path 61a through oblique paths 61c, with the chamber 57c through an air path 61d, and with an area A between the nozzle pipe 50 and the filler pipe 4 through a pressure guide 61e.

The fuel reaching the upstream side of the second valve mechanism 60 enters the path 61a of the seat 61. The fuel pushes the spring 63 and reaches the downstream side of the second valve mechanism 60. Then, the fuel goes out of the refueling nozzle 5, passes through the filler pipe 4, and enters the fuel storage part K.

The fuel from the refueling nozzle 5 brings air into the fuel storage part K. At this time, the conduit 8 is open to the fuel storage part K, and therefore, the air brought into the part K escapes through the conduit 8 to the outside of the nozzle pipe 50. As a result, no negative pressure occurs in the area A.

Accordingly, the chamber 57c of the diaphragm 57 has no negative pressure, and the shaft 58 is kept at the right end position to stop the free end 56a of the lever 56 on the stopper 59b. Consequently, the first valve mechanism 51 is kept open to pass fuel.

When the fuel storage container 1 is fully filled with fuel, the liquid fuel closes the opening of the conduit 8. Then, the air brought into the fuel storage part when fuel comes out of the nozzle pipe 50 is not returned to the outside of the nozzle pipe 50 through the conduit 8. Then, a negative pressure is produced in the area A.

This produces a negative pressure in the chamber 57c of the diaphragm 57, to move the shaft 58 to left. The free end 56a of the lever 56 separates from the stopper 59b, and the lever 56 is pushed downwardly by the spring 59a to a position indicated with a dotted line.

As a result, the spring 54 pushes the plug 53 of the first valve mechanism 51 toward the seat 52, to close the path 52a and stop fuel from entering. Then, the plug 62 of the second valve mechanism 60 closes the path 61a.

When the refueling nozzle 5 is pulled out, the check valve 7 prevents the fuel in the fuel storage part K from blowing back into the filler pipe 4.

During refueling, evaporated fuel passes through the vapor line 11 and is adsorbed by the canister 13.

As the quantity of liquid fuel in the part K increases, the pressure of the space L increases to open the second valve 15b of the pressure adjuster 15, thereby maintaining the pressure of the space L at a proper level.

Figure 3:
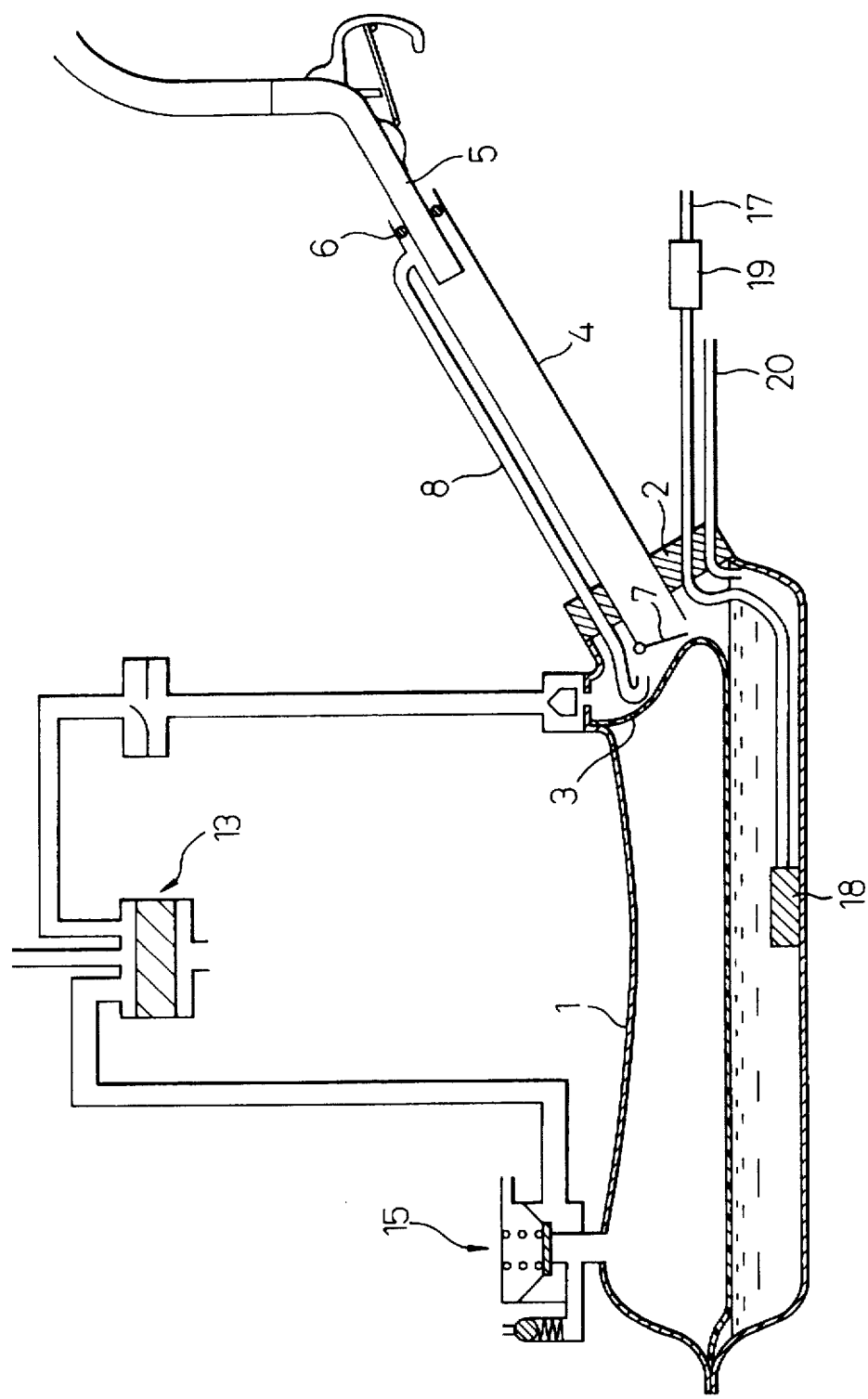
FIG. 3 shows a fuel storing device according to a second embodiment of the present invention.

FIG. 3 shows a fuel storing device for an automobile according to the second embodiment of the present invention. The second embodiment curves the front end of the conduit 8, instead of employing the conduit cover 9 of the first embodiment. The other parts of the second embodiment are the same as those of the first embodiment. An opening of the curved end of the conduit 8 faces the flange 2. Even if the amount of fuel in the fuel storage part K is too little to greatly deform the separator film 3, the separator film 3 will never block the opening of the curved end of the conduit 8.

Accordingly, the second embodiment provides the same effect, as the first embodiment, of automatically stopping refueling only after the fuel container 1 is fully filled with fuel.

Compared with the first embodiment, the second embodiment is simpler and cheaper because it provides the effect of the present invention by only bending the front end of the conduit 8.

Figure 4:
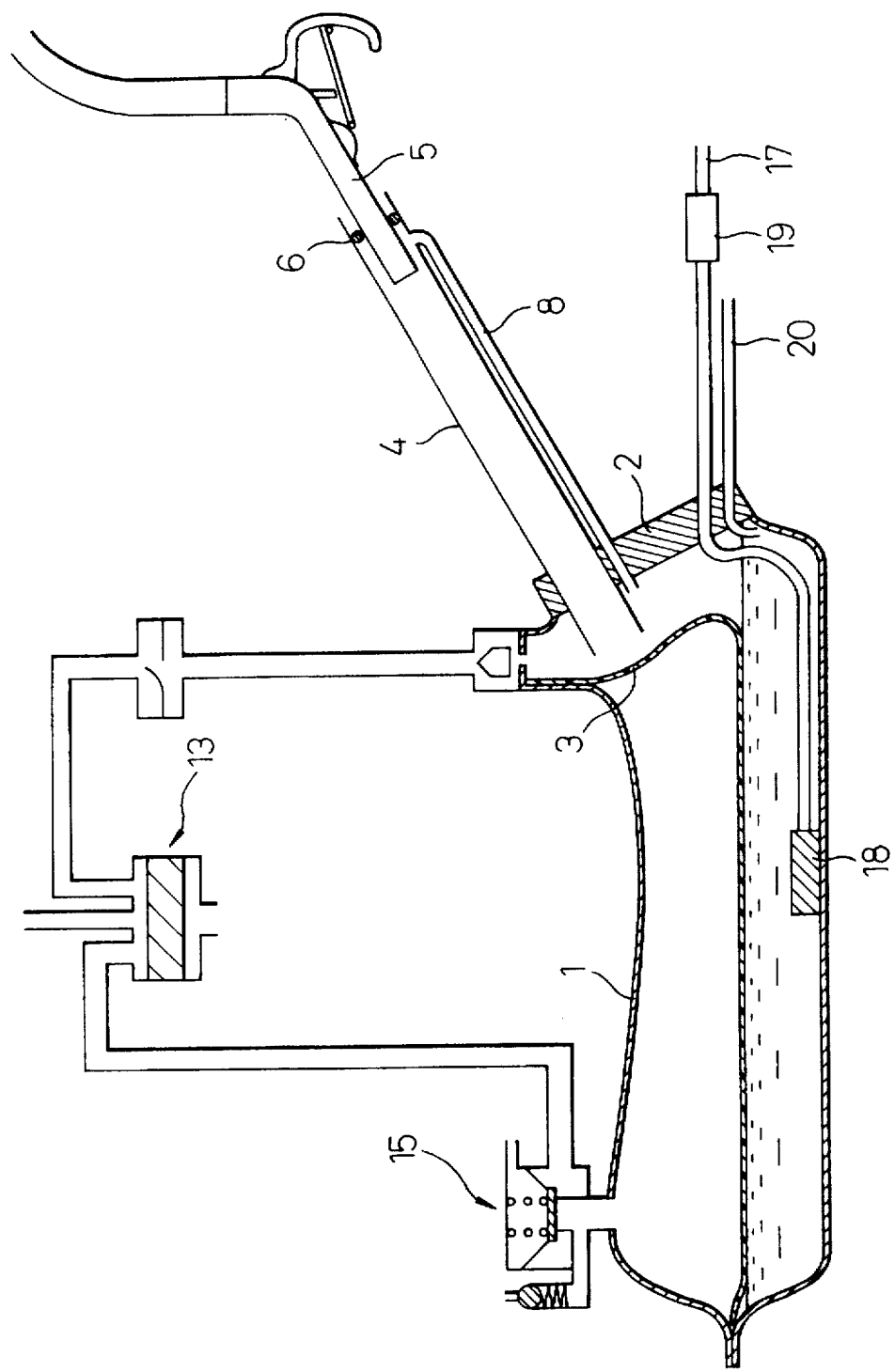
FIG. 4 shows a fuel storing device according to a third embodiment of the present invention.

FIG. 4 shows a fuel storing device for an automobile according to the third embodiment of the present invention. The third embodiment extends the filler pipe 4 over the conduit 8 in the vicinity of the fuel storage part K, instead of employing the conduit cover 9 of the first embodiment. The other parts of the third embodiment are the same as those of the first embodiment.

Even if the amount of fuel in the storage part K is too little to greatly deform the separator film 3, the separator film 3 will never block the opening of the front end of the conduit 8 because the extending end of the filler pipe 4 interferes with the separator film 3.

Accordingly, the third embodiment provides the same effect as the first and second embodiments of automatically stopping refueling only after the fuel storage container 1 is fully filled with fuel.

Compared with the first and second embodiments, the third embodiment is cheaper because it needs no additional parts or a bending process.

Figure 5:
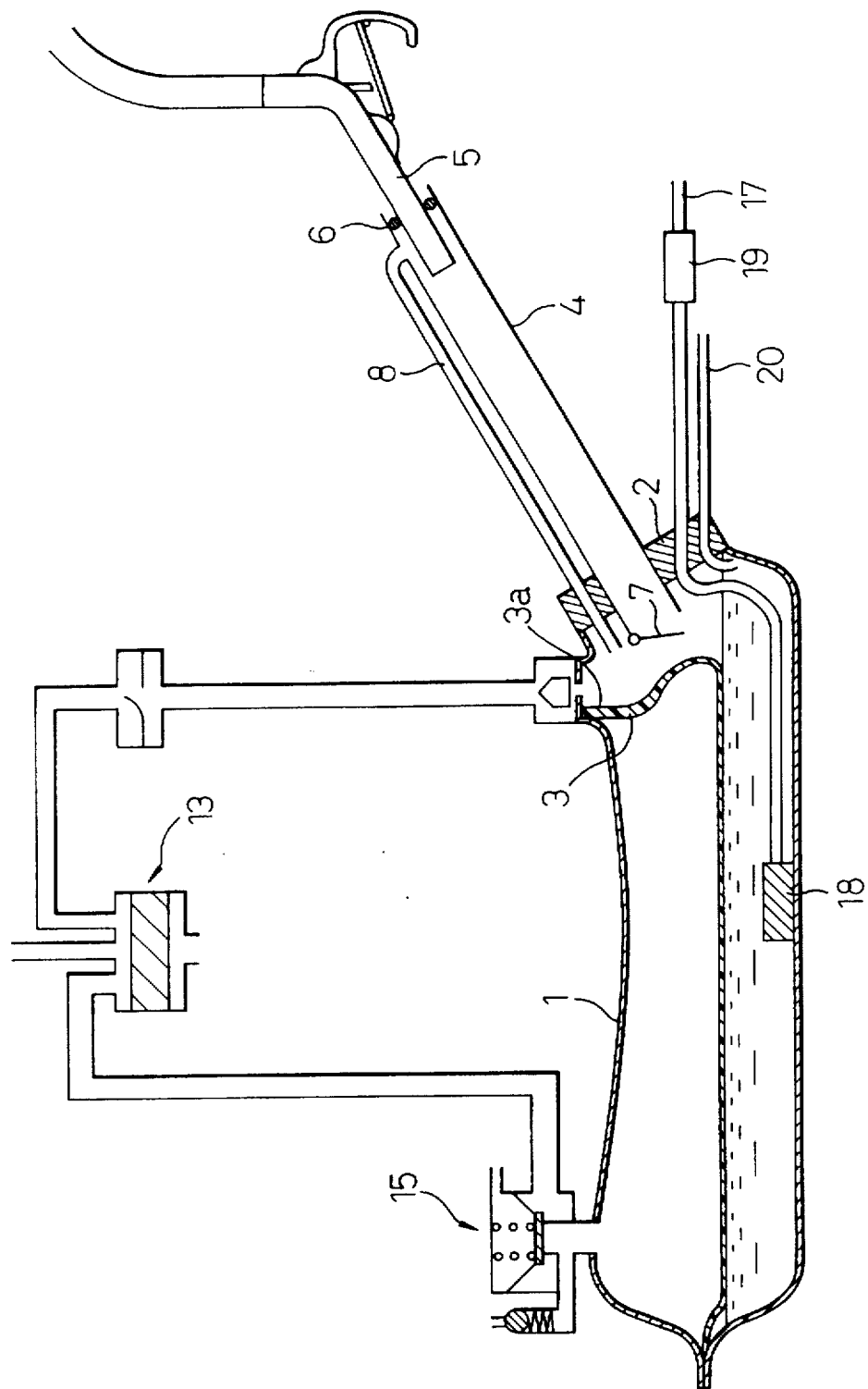
FIG. 5 shows a fuel storing device according to a fourth embodiment of the present invention.

FIG. 5 shows a fuel storing device for an automobile according to the fourth embodiment of the present invention. The fourth embodiment provides the separation film 3 with a thick part 3a that is relatively rigid, instead of employing the conduit cover 9 of the first embodiment. The other parts of the fourth embodiment are the same as those of the first embodiment. Even if the amount of fuel in the fuel storage part K is too little to greatly deform the separation film 3, the separation film 3 will never block the opening of the front end of the conduit 8 because the thick part 3a is rigid and does not deform.

Accordingly, the fourth embodiment provides the same effect, as the first to third embodiments, of automatically stopping refueling only after the fuel storage container is fully filled with fuel.

Compared with the first and second embodiments, the fourth embodiment is cheaper because it needs no additional parts or a bending process.

Figure 6:
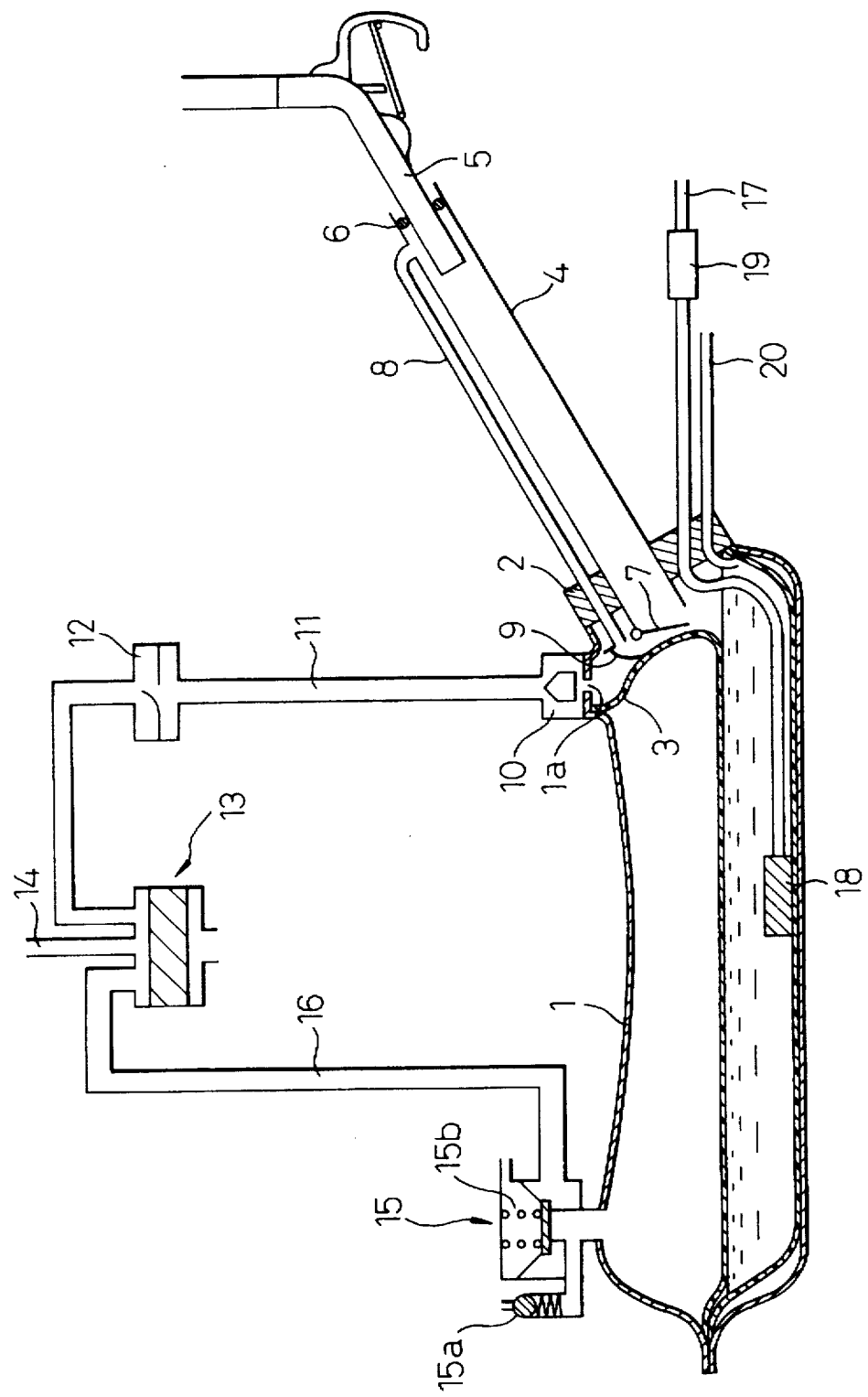
FIG. 6 shows a fuel storing device according to a fifth embodiment of the present invention.

FIG. 6 shows a fuel storing device for an automobile according to the fifth embodiment of the present invention. The fifth embodiment shapes the separator film 3 into a bag 3a and encloses the fuel storage part K with the bag 3a. The other parts of the fifth embodiment are the same as those of the first embodiment.

The separation bag 3a of the fifth embodiment is applicable to any one of the second to fourth embodiments.

Figure 7:
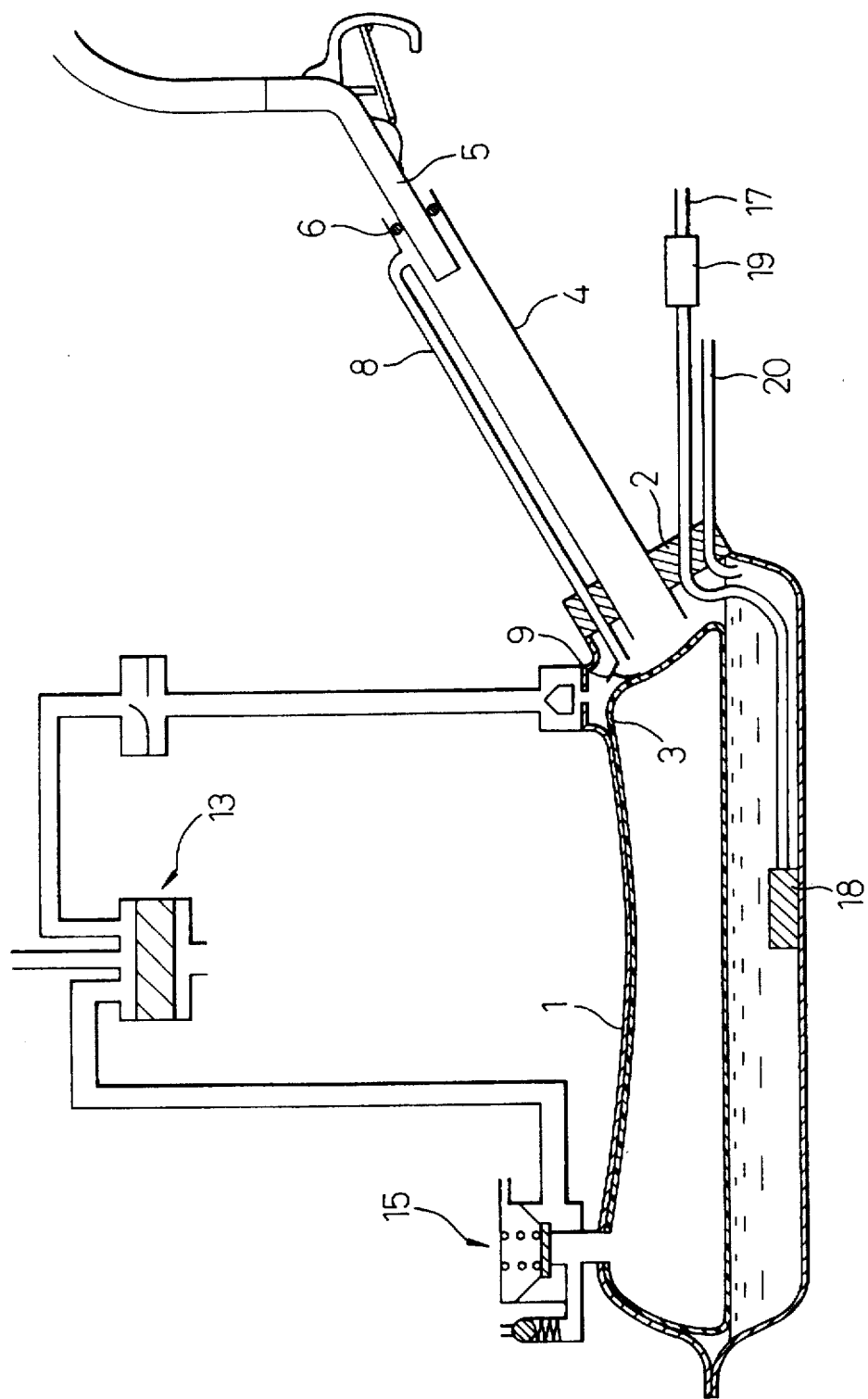
FIG. 7 shows a fuel storing device according to a sixth embodiment of the present invention.

FIG. 7 shows a fuel storing device for an automobile according to the sixth embodiment of the present invention. The sixth embodiment shapes the separator film 3 into a bag 3b and encloses the space L with the bag 3b. The other parts of the sixth embodiment are the same as those of the first embodiment.

The separation bag 3b of the sixth embodiment is applicable to any one of the second to fourth embodiments.

As explained above, the present invention provides a fuel storing device for an automobile, having a separator film that separates the inside of a fuel storage container of the fuel storing device into a fuel storage part and a space above the fuel storage part, which can prevent an automatic stopper of a refueling nozzle from erroneous operation to stop refueling before the fuel storage container is fully filled with fuel.

What is claimed is:

1. A fuel storing device for an automobile, comprising:

a fuel storage container;

a flexible separator film arranged in said fuel storage container, to separate the inside of said fuel storage container into a fuel storage part and a space, said separator film being movable with the surface of liquid fuel in said fuel storage container;

a filler pipe connected to said fuel storage part;

a nozzle seal arranged in said filler pipe, for sealing a gap with respect to a refueling nozzle inserted into said filler pipe;

a conduit for communicating a part of said filler pipe adjacent to the nozzle seal with an upper part of said fuel storage part; and closure preventive means for preventing said separator film from closing an opening of said conduit toward said fuel storage part.

2. A fuel storing device according to claim 1, wherein the closure preventive means is a separately located cover for the opening of said conduit at the upper part of said fuel storage part.

3. A fuel storing device according to claim 1, wherein the closure preventive means is formed by bending an end of said conduit so that the opening of the end of said conduit is out of the moving range of the separator film.

4. A fuel storing device according to claim 1, wherein the closure preventive means is formed by extending the filler pipe over said conduit at the upper part of said fuel storage part.

5. A fuel storing device according to claim 1, wherein the closure preventive means is a means for preventing the separator film from deforming to close the opening of said conduit at the upper part of said fuel storage part.

6. A fuel storing device according to claim 5, wherein said closure preventing means is formed by partly thickening said separator film.

7. A fuel storing device according to claim 1, wherein the separator film is shaped into a bag to enclose one of said fuel storage part and space defined in said fuel storage container.

8. A fuel storing device according to claim 7, wherein said bag encloses said fuel storage part in said fuel storage container.

9. A fuel storing device according to claim 7, wherein said bag encloses said space in said fuel storage container.

* * * * *